United States Patent
Oh

(10) Patent No.: US 7,624,465 B2
(45) Date of Patent: Dec. 1, 2009

(54) FOAM WITH GREEN TEA ADDITIVE FOR FOAM MATTRESSES, PILLOWS AND CUSHIONS

(75) Inventor: Suk Kan Oh, Fujian (CN)

(73) Assignee: Zinus, Inc., Pleasanton, CA (US)

(*) Notice: Subject to any disclaimer, the term of this patent is extended or adjusted under 35 U.S.C. 154(b) by 52 days.

(21) Appl. No.: 12/214,080

(22) Filed: Jun. 16, 2008

(65) Prior Publication Data

US 2008/0307583 A1 Dec. 18, 2008

(30) Foreign Application Priority Data

Jun. 18, 2007 (CN) ................. 2007 1 0009121

(51) Int. Cl.
*A47C 27/15* (2006.01)
(52) U.S. Cl. .............. 5/740; 5/641; 5/690; 5/655.9; 5/951; 428/318.4; 521/109.1
(58) Field of Classification Search ............. 5/690, 5/740, 641, 951, 655.9; 428/318.4, 304.4; 442/221, 370; 521/109.1, 99, 155
See application file for complete search history.

(56) References Cited

U.S. PATENT DOCUMENTS

| | | | | |
|---|---|---|---|---|
| 6,151,733 A | * | 11/2000 | Takashima | 5/636 |
| 6,173,675 B1 | * | 1/2001 | Licciardo | 119/28.5 |
| 6,430,764 B1 | * | 8/2002 | Peters | 5/641 |
| 2006/0272098 A1 | * | 12/2006 | Hochschild | 5/727 |
| 2007/0287002 A1 | * | 12/2007 | Cabados | 428/319.3 |

* cited by examiner

*Primary Examiner*—Alexander Grosz
(74) *Attorney, Agent, or Firm*—Imperium Patent Works; Darien K. Wallace; T. Lester Wallace

(57) ABSTRACT

A method of making foam imparts antimicrobial and antiodorant qualities to the foam. Green tea powder is added to the polyol raw materials for making memory foam. The green tea memory foam is used to make pillows, cushions and mattresses. Green tea foam in the top layer of a mattress acts as an antiodorant such that less of the chemical smell of the memory foam is perceived by the user. In addition, the bacteria and mold that would otherwise develop in the moist warmer sleeping environment on memory foam are killed by the green tea additive to the foam. Measurable antimicrobial and antiodorant qualities in the green tea foam are achievable by adding green tea powder constituting less than 2% of the weight of the resulting green tea foam.

10 Claims, 3 Drawing Sheets

FOAM WITH GREEN TEA ADDITIVE FOR FOAM MATTRESSES, PILLOWS AND CUSHIONS

CROSS REFERENCE TO RELATED APPLICATION

This application is based on and hereby claims the benefit under 35 U.S.C. §119 from Chinese Patent Application No. 200710009121.2, filed on Jun. 18, 2007, in China, the contents of which are hereby incorporated by reference. This application is a continuation-in-part of Chinese Application No. 200710009121.2.

TECHNICAL FIELD

The described embodiments relate to foam additives, and more particularly to adding green tea to foam used in bedding products.

BACKGROUND INFORMATION

Due to their good breathability and elasticity characteristics, various foams are used to make items that come into contact with the human body, such as mattresses, pillows and cushions. Throughout one's life, one spends much time asleep. Therefore, the comfort of mattresses and pillows correlates to the degree of healthy recovery of the human body. Thus, pillows and mattresses with therapeutic functions were born. In some cases, raw materials from plants are added to pillow fillings in order to generate a therapeutic function to the human body by taking advantage of the smell generated. It is uncommon, however, to add raw materials from plants into mattresses. Tea leaves have been placed directly into pillow fillings because of perceived ability of tea leaves to brighten the eyesight, refresh the brain and resist radiation.

Placing crushed tea leaves in a pillow case or mattress covering, however, detracts from the comfort of the pillow or mattress. In addition, as mattresses, pillows and cushions are used, the tea leaves are crushed and tea leaf dust is formed. The tea leave dust then seeps out of the pillow case or mattress covering.

A manufacturing process is sought for allowing users of mattresses, pillows and cushions to take advantage of the benefits of tea leaves, but that also avoids the disadvantages of leaking tea leaf dust.

SUMMARY

A method of making foam imparts antimicrobial and antiodorant qualities to the foam.

Polyol raw materials and a green dye are mixed together, and then a silicone surfactant is added. The polyol raw materials include a memory foam polyol, a polyol for polyurethane and a polymer polyol. The silicone surfactant is mixed with the polyol raw materials. Green tea powder is then added to the green polyol raw materials. Water and the catalyst isocyanate are added to the green polyol raw materials to make green tea foam.

The green tea memory foam is used to make pillows, cushions and mattresses. Bacteria, mites and mold that live in the fabric of a pillow case are killed when they come into contact with the green tea foam. In addition, the green tea additive decreases the smell of the memory foam chemicals in the memory foam pillow.

Green tea foam in the top layer of a mattress acts as an antiodorant such that less of the chemical smell of the memory foam is perceived by the user. In addition, people sleep warmer and tend to perspire on memory foam. The bacteria and mold that are attracted to the warm moist environment on memory foam are killed by the green tea additive to the foam. Measurable antimicrobial and antiodorant qualities in the green tea foam are achievable by adding green tea powder constituting less than 2% of the weight of the resulting green tea foam.

Green tea powder or extract provides a natural, plant-based means for reducing the chemical odor of foam mattresses.

Further details and embodiments are described in the detailed description below. This summary does not purport to define the invention. The invention is defined by the claims.

BRIEF DESCRIPTION OF THE DRAWINGS

The accompanying drawings illustrate embodiments of the invention.

DETAILED DESCRIPTION

The present invention provides a method of manufacturing a foam that has the therapeutic functions of the tea plant (*Camellia sinensis*) and that can be made into a pillow, cushion or mattress. The method provides a delivery mechanism for delivering green tea along with bedding products. In the manufacturing method, ground tea leaves or tea stems are added to the raw materials used to make the foam, and the green tea powder becomes evenly dispersed in the foam as the foam sets up.

Figure 1:
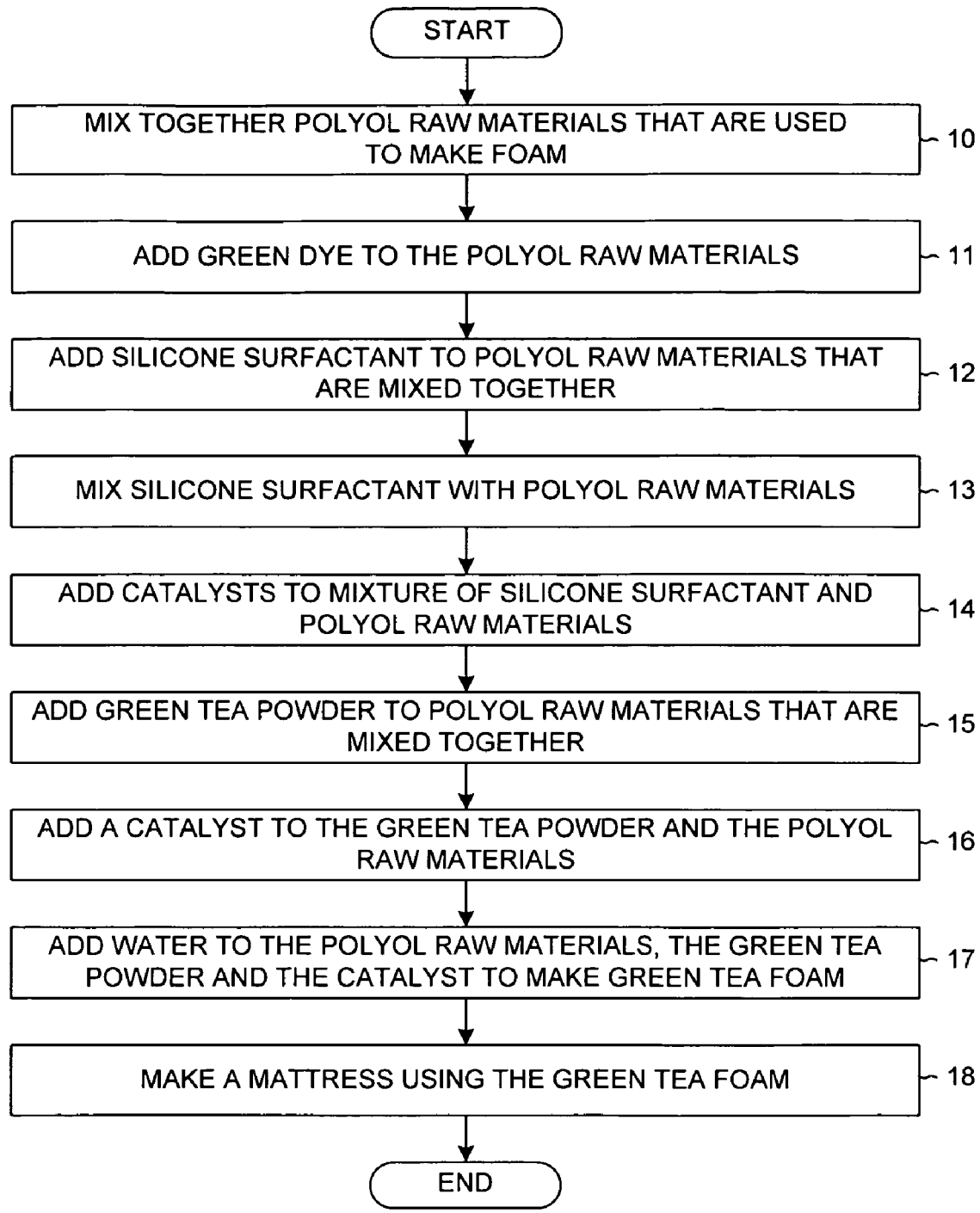
FIG. 1 is a flowchart illustrating steps of a method for controlling bacterial and germ growth and for absorbing odors in foam.

FIG. 1 is a flowchart illustrating steps 10-18 of a method for controlling bacterial, germ and mold growth and for absorbing odors in foam. In one embodiment, antimicrobial and antiodorant qualities are imparted to polyurethane foam used to make a mattress. The polyurethane foam is visco-elastic or "memory" foam and is used to make the top layer of the mattress on which a user directly rests.

In a first step 10, three different polyol raw materials are mixed together. To make memory foam, a memory foam polyol is mixed together with a polyol for polyurethane and a polymer polyol. In one embodiment, the relative volumes of (i) the memory foam polyol, (ii) the polyol for polyurethane and (iii) a polymer polyol are 2:1:1. Different ratios result in memory foam with different firmness and density. The three polyols are mixed for about 30 minutes.

In a step 11, a green dye is added to the mixture of polyol raw materials. The green tea powder added later is actually yellow and does not impart a green color to the foam. Adding green dye to make the top foam layer green adds to consumer awareness that the mattress contains green tea.

In a step 12, a silicone surfactant is added to the green mixture of polyol raw materials. Silicone surfactant in the amount of about 1% by weight is added to the colored mixture of polyol raw materials.

In a step 13, the silicone surfactant and the mixture of polyol raw materials are mixed. The silicone surfactant creates a consistent foaming reaction between the different chemical functional groups of the molecules of the three different polyols. The silicone surfactant promotes a stable rising of the foam and a stable cell structure of the foam. Creating a homogeneous polyurethane reaction allows the green tea powder added later to be more evenly disbursed throughout the foam. A homogeneous polyurethane reaction also promotes dispersion of the catalysts that are added later. The silicone surfactant is a combination of molecules having hydrophobic and hydrophilic functional groups. There are various silicone surfactants that are more or less hydrophobic or hydrophilic. In one embodiment, a more hydrophilic silicone surfactant is used to accommodate the green tea powder. For example, a silicone surfactant made by the General Electric company can be used.

In a step 14, catalysts are added to the mixture of silicone surfactant and the polyol raw materials. In one embodiment, three catalysts are added: two tin jelling catalysts and one amine foam-blowing catalyst. The catalysts, a physical property promoter, the silicone surfactant and the polyol raw materials are mixed for about an hour. The catalysts accelerate the chemical foaming reaction once the isocyanate and water are added.

In a step 15, green tea powder is added to the mixture from step 14, and the mixture is agitated for about an additional thirty minutes. Measurable antimicrobial and antiodorant qualities in the green tea foam are achievable by adding green tea powder constituting even less than 2% of the weight of the resulting green tea foam. In one embodiment, green tea powder in an amount of about 0.1% of the total weight of the mixture from step 14 is added in step 15. In another embodiment, the volume of the tea leaf powder or tea water solution accounts for about 1% to 15% of the total volume of the polyol raw materials. Although only a small relative amount of green tea powder is added, the amount of silicone surfactant added in step 13 should be increased to compensate for the weight of the green tea powder. In another embodiment, instead of green tea powder, a green tea water solution is added to the mixture of step 14.

In a step 16, the catalyst isocyanate is added to the green tea mixture of step 15. Isocyanate in the presence of water begins the reaction that forms polyolurethane foam from the mixture of step 15. The catalysts of step 14 accelerate the reaction, whereas the reaction will not take place without the catalyst isocyanate.

In a step 17, water is added to the green tea mixture of step 15 and the isocyanate. In one embodiment, less than one percent water by volume is added to the mixture of step 15. When the water is added, the green tea forms within about three minutes. It takes about 24 hours, however, for all of the molecules of the raw materials to undergo the chemical reaction. During the chemical reaction, heat is generated inside the foam. During the 24-hour curing time, this heat and much of the foam smell dissipates.

Where a green tea water solution is added in step 15, the chemical reaction the forms foam begins as soon as the isocyanate is added in step 16. Adding additional water in step 17 is not necessary if sufficient water is added in step 15 in the form of the green tea water solution. In another embodiment, isocyanate and water are together injected into the mixture of step 15 as the mixture flows past into an agitating head of a foam-making machine.

By adding the green tea ingredients directly into the raw materials of the foam that is tailored into a pillow, cushion or mattress, the need for a separate structure in the pillow, cushion or mattress to accommodate the green tea ingredients is avoided. The foam containing green tea ingredients thus achieves a therapeutic function to the human body and imparts to the foam a resistance to insects, bacteria and mold.

In another embodiment, the volume of the aforementioned tea leaf powder or green tea water solution account for between 1% to 15% of the entire volume of the foam raw materials. Either the 1% to 15% tea leaves or stems are added into the already foaming raw materials of the foam, or 1% to 15% tea leaf powder or tea leaf water solution are added before the polyol raw materials are foamed and shaped in a mechanical foaming device and shaped into a foam with tea ingredients. Tea leaves, tea stems or green tea powder are evenly distributed in the foam to provide a therapeutic function.

In a step 18, the green tea foam is used to make a pillow, cushion or mattress.

Figure 2:
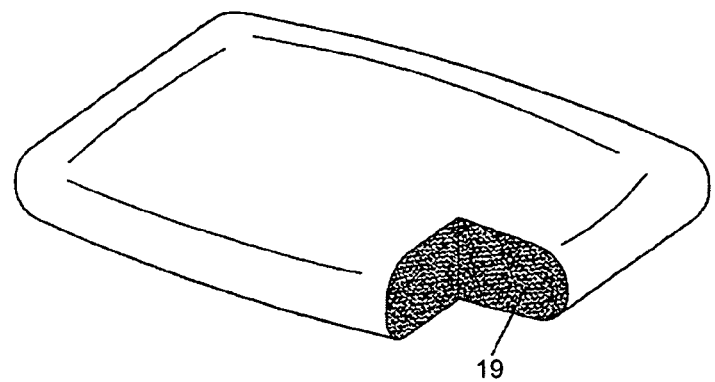
FIG. 2 illustrates green tea foam that has been shaped directly into a pillow or cushion.

FIG. 2 illustrates green tea foam manufactured according to the method of FIG. 1 that has been shaped directly into a pillow or cushion. FIG. 2 shows that tea leaves or stems 19 are evenly distributed in the green tea foam. Mites and mold that might otherwise accumulate in the fabric of a pillow case are controlled in proximity to the green tea foam. In addition, the green tea additive decreases the smell of the memory foam chemicals in the memory foam pillow. This solves one of the main consumer complaints of pillows made from memory foam. There is no need to place a separate structure in the pillow of FIG. 2 to accommodate ground tea leaves or stems. Thus, the manufacturing process of the pillow is simpler and cheaper than including a receptacle for tea leaves. The evenly distributed tea leaves or stems are resistant to insects, bacteria and mold.

Figure 3:
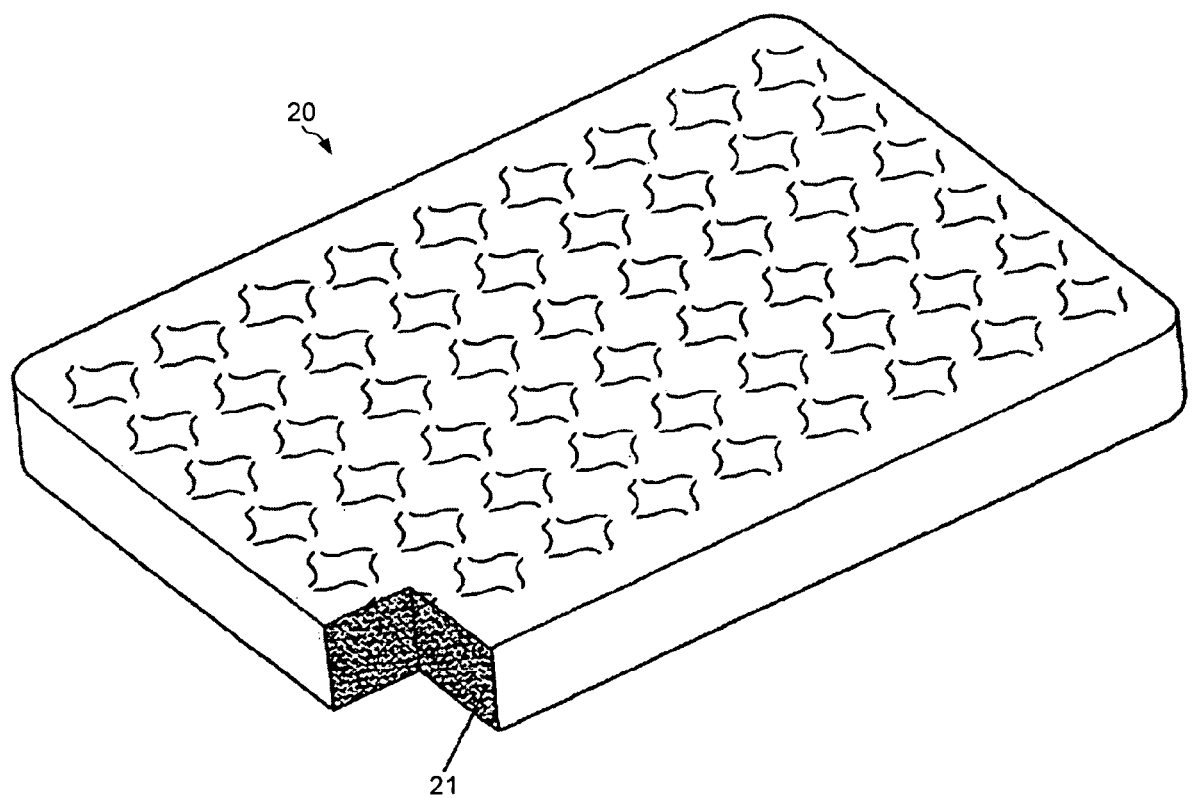
FIG. 3 shows a mattress made from green tea foam in which the tea is evenly distributed throughout the foam.

FIG. 3 shows a mattress 20 made from the green tea foam manufactured according to the method of FIG. 1. Tea leaves or stems 21 are evenly distributed in the green tea foam of mattress 20.

Figure 4:
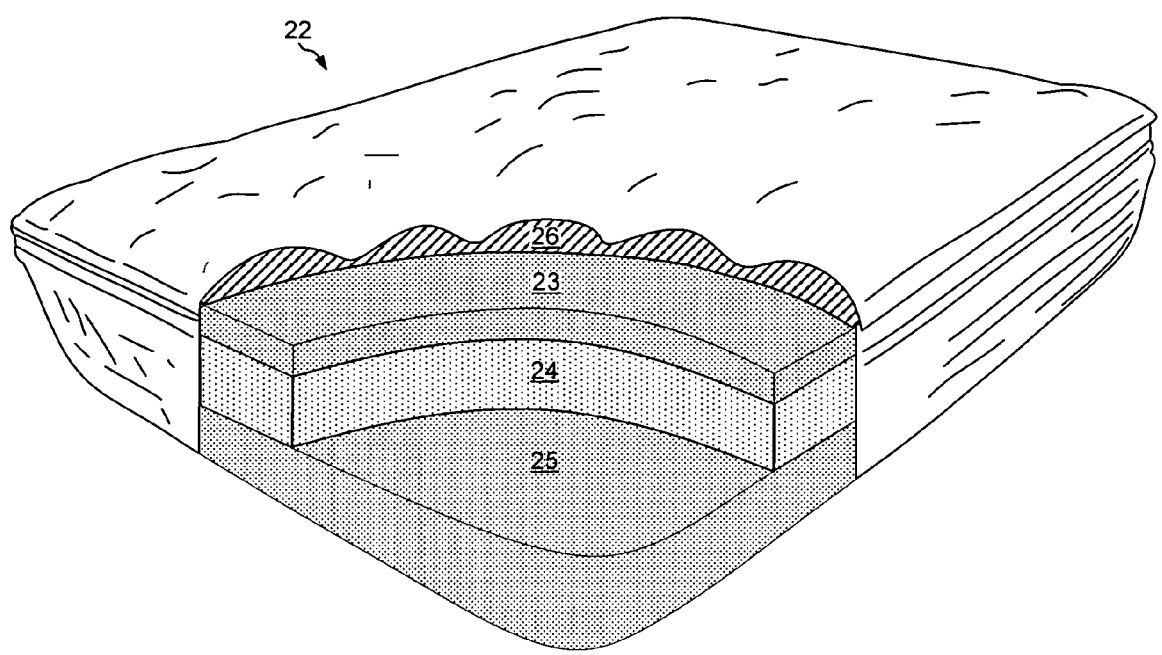
FIG. 4 shows a multi-layered foam mattress in which only the top foam layer contains green tea and is colored green.

FIG. 4 shows a mattress 22 made from multiple layers 23-25 of foam. In one embodiment, only the top foam layer 23 of the mattress contains green tea and is colored green. A person using mattress 22 lies directly on layer 23 through a thin quilted fiber padding 26 of the mattress cover. The green tea in top layer 23 acts as an antiodorant such that less of the chemical smell of the memory foam is perceived by the user. In addition, people tend to perspire more while sleeping on memory foam. The bacteria and mold that would otherwise develop in the moist environment of the memory foam are killed by the green tea additive to the foam. The green-colored top layer is helpful in marketing the mattress where a cutaway display sample is used in a showroom. Top foam layer 23 is made of green tea memory foam, whereas bottom layer 26 is made of rigid high density HD foam. Middle layer 24 is made of chopped up chunks of memory foam glued together with pieces of regular polyurethane foam to prevent a user from "bottoming out" on harder bottom layer 25. Optionally, all three layers 23-25 of foam include green tea powder.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A mattress comprising:
   a lower layer of high density foam;
   a second layer made of chopped up chunks of memory foam glued together with pieces of polyurethane foam;
   a green-colored top layer of polyurethane memory foam that contains green tea and a green dye; and
   a fabric covering around the mattress.

2. The mattress of claim 1, wherein the green-colored top layer of polyurethane memory foam is made from the green tea in a form taken from the group consisting of: a powder of green tea leaves, a powder of green tea stems, and a water solution of green tea extract.

3. The mattress of claim 1, wherein the green tea constitutes less than 2% of the weight of the polyurethane memory foam.

4. The mattress of claim 1, wherein the green-colored top layer of polyurethane memory foam is displayed in a cut-away display sample of the mattress.

5. The mattress of claim 1, wherein the polyurethane memory foam has a chemical odor, and wherein the green tea reduces the chemical odor.

6. The mattress of claim 1, wherein the green-colored top layer of polyurethane memory foam is made by adding a hydrophilic silicone surfactant to disburse the green tea evening throughout a mixture of polyol raw materials.

7. The mattress of claim 1, wherein the green-colored top layer of polyurethane memory foam includes a sufficient amount of green tea to impart antibacterial properties to the polyurethane memory foam.

8. The mattress of claim 1, wherein the fabric covering includes a thin quilted fiber padding directly above the green-colored top layer of polyurethane memory foam.

9. The mattress of claim 1, wherein the second layer prevents a user from bottoming out on the lower layer of high density foam.

10. The mattress of claim 1, wherein the memory foam of the second layer also includes green tea.

* * * * *

UNITED STATES PATENT AND TRADEMARK OFFICE
CERTIFICATE OF CORRECTION

PATENT NO. : 7,624,465 B2  Page 1 of 1
APPLICATION NO. : 12/214080
DATED : December 1, 2009
INVENTOR(S) : Suk Kan Oh It is certified that error appears in the above-identified patent and that said Letters Patent is hereby corrected as shown below:

Column 6, line 2, the word "evening" should be changed to --evenly--.

The text of column 5, line 15 - column 6, line 2 should now read:

6. The mattress of claim 1, wherein the green-colored top layer of polyurethane memory foam is made by adding a hydrophilic silicone surfactant to disburse the green tea evenly throughout a mixture of polyol raw materials.

Signed and Sealed this

Twenty-sixth Day of January, 2010

David J. Kappos
*Director of the United States Patent and Trademark Office*